United States Patent [19]
Hommerin

[11] 3,849,660
[45] Nov. 19, 1974

[54] SYSTEM FOR PROCESSING FILM

[75] Inventor: Michel Hommerin, Paris, France

[73] Assignee: Compagnie Generale de Radiologie, Paris, France

[22] Filed: Apr. 13, 1973

[21] Appl. No.: 350,764

[30] Foreign Application Priority Data
Apr. 19, 1972 France .............................. 72.13830

[52] U.S. Cl. .......................... 250/570, 235/61.11 E
[51] Int. Cl. ........................................ G01n 21/30
[58] Field of Search .......... 95/75, 100; 250/219 FR, 250/219 DR, 219 D, 219 DD, 219 DC, 214, 566, 568, 570, 571; 235/61.11 E; 356/202, 203; 355/38, 41, 68

[56] References Cited
UNITED STATES PATENTS

| | | | |
|---|---|---|---|
| 3,518,440 | 6/1970 | Hanson | 250/219 D |
| 3,529,133 | 9/1970 | Kent | 250/219 D |
| 3,562,536 | 2/1971 | Brunner | 235/61.11 E |
| 3,609,306 | 9/1971 | Langley | 250/219 D |
| 3,649,814 | 3/1972 | Spanjersburg | 250/219 D |
| 3,694,074 | 9/1972 | Huboi | 355/41 |
| 3,699,349 | 10/1972 | Paulus | 250/219 FR |
| 3,700,320 | 10/1972 | Brewer | 250/219 FR |
| 3,721,495 | 3/1973 | Tanaka | 355/41 |
| 3,723,710 | 3/1973 | Crouse | 250/219 D |

Primary Examiner—James W. Lawrence
Assistant Examiner—D. C. Nelms
Attorney, Agent, or Firm—Edwin E. Greigg

[57] ABSTRACT

A system for processing photographic or radiographic film which has sensible zones coded with information concerning film-speed (sensitivity), type or quality. Coded information concerning format and size could also be provided. This coded information is encoded prior to the exposure of the film and capable of being decoded at any time. The encoding consists of transverse zones of altered transmissivity and/or reflectivity with respect to radiation which is emitted by sources located opposite one surface of the film and which is detected by appropriate detector-cells located opposite the other surface of the film. Alternatively, the zones may themselves be sources of radiation or of fields, e.g. magnetic fields. In all cases, the radiations and/or fields are non-actinic with respect to the photographic or radiographic emulsion, i.e. they do not cause physical or chemical changes in the emulsion. The motion of the zones past the detector-cells results in the emission of electrical signals which are decoded and used in activating mechanical or other control devices for developing and formatting the film and may also be used for inventory control.

9 Claims, 4 Drawing Figures

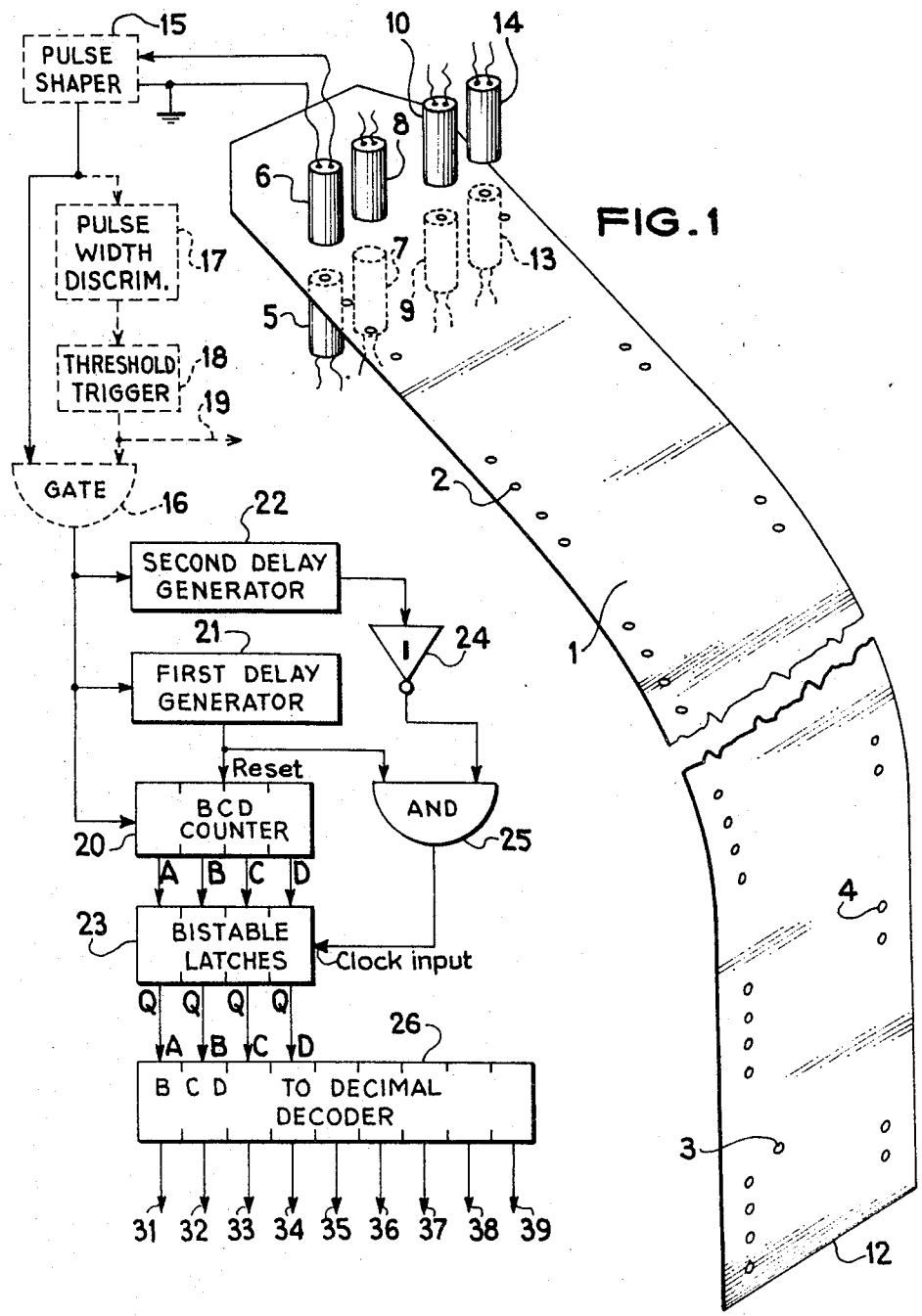

SYSTEM FOR PROCESSING FILM

BACKGROUND OF THE INVENTION

This invention relates to a system for processing photographic and radiographic film and, more particularly, to a system including unexposed film having coded information about film-speed (sensitivity), film-type, formats and/or other information thereon. The information can be used by automatic developing apparatus, associated camera apparatus, inventory control apparatus and/or the like.

As long as manipulation of film, particularly radiographic film, is entirely manual, the absence of information which is readable by a human operator or by a machine prior to the development of the film is not a great inconvenience. An operator would carry the film, for example in its light-tight cassette, to and from a camera, where it is exposed, and, hence, to developing baths or an automatic developing machine, there being no necessity for reading, prior to development, any information which may be present on the film.

In newer radio-diagnostic machines, however, the entire film-manipulation, including loading, exposing and developing, is mechanical and automatic. These newer machines are often remotely controlled. The film is supplied in rolls containing many frames. Therefore, the film must carry characteristic information, prior to its development, so as to permit control of the automatic manipulative systems, e.g. those used in development and formatting. Among the information required by these machines are the film-speed (sensitivity) and the geometric characteristics, e.g. dimensions and indications of beginning and end of the film. Heretofore, surface modifications to the films have been either intended for entirely mechanical, manipulative purposes, e.g. they were central or lateral perforations used for film-transport, or else these modifications were such as could be read and used only after development, e.g. latent images.

SUMMARY OF THE INVENTION

The principal object of the present invention is to provide a system for processing film which includes coded information on photographic or radiographic film.

It is a further object of the present invention to provide a system for processing film having coded information thereon which is readable at any time, both before and after exposure of the film.

It is an additional object to provide a system for processing film having coded information thereon in which one or more processing steps are controlled by the coded information.

The foregoing objects, as well as others which are to become clear from the text which follows, are accomplished by providing a system for processing unexposed photographic or radiographic film having sensible zones. The sensible zones are present in predetermined numbers at predetermined locations for identifying in code at least one characteristic of the film. At least one sensor is positioned in close proximity to the film for sensing passage of the zones. Film transport devices are provided for driving the film past the sensor.

The system preferably includes a film having zones of altered transmissivity and/or reflectivity with respect to non-actinic radiation emitted by at least one source and received by at least one detector-cell sensitive to this radiation. The number and location of the zones is characteristic of the desired information. The motion of any one of the zones past the detector-cell results in the production of a signal by that detector-cell.

BRIEF DESCRIPTION OF THE DRAWING

These and other objects of the present invention will be apparent from the following description and the accompanying drawings in which:

FIG. 1 shows diagrammatically an exemplary preferred embodiment of a system for processing photographic or radiographic film according to the present invention;

Figure 3:
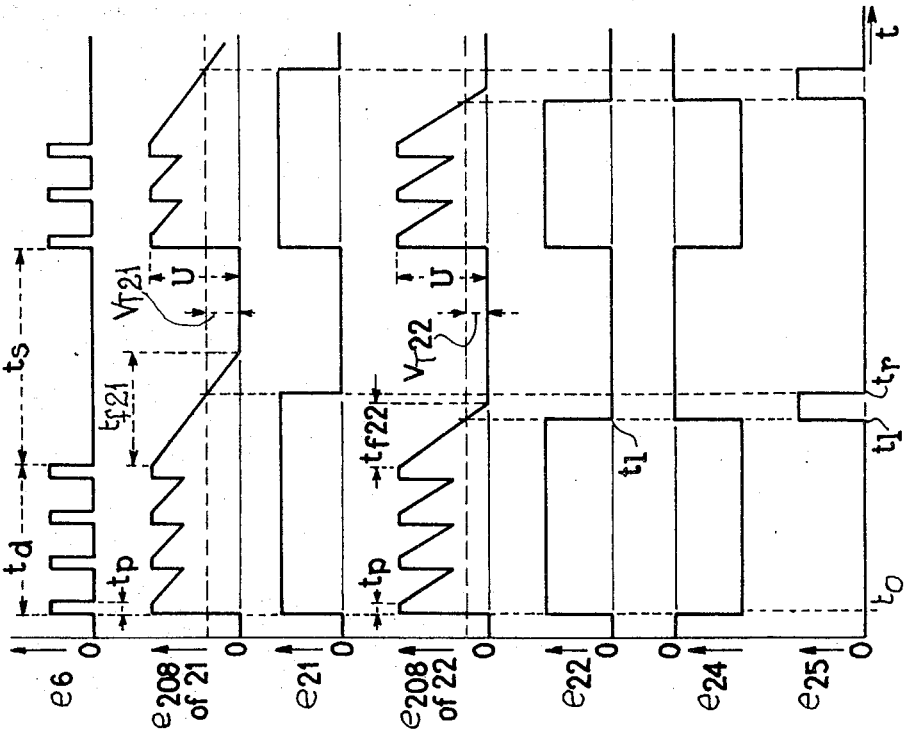
FIG. 3 shows the waveforms at the respective outputs of several circuit elements of FIG. 1.

DETAILED DESCRIPTION OF THE PREFERRED EMBODIMENTS.

As illustrated in the FIG. 1 of the drawing, the system according to the present invention includes a film 1 having a surface modified by creating therein a series of holes 2, 3, 11 and 4 which are disposed transversely. As to be explained in more detail further on, the holes 2, 3, 11 and 4 are intended to permit respectively activation of respective photoelectric detector-cells 6, 8, 10 and 14 when they pass between respective sources 5, 7, 9 and 13 of radiation and respective ones of these detector-cells. The holes 2, 3, 4 and 11 are either simple perforations or, more generally, zones of discontinuity in which the transmissivity and/or reflectivity, with respect to the particular radiation utilized, is different from that which is present in the other parts of the film 1, this difference existing both prior to and after the development of the film, in such a way that passage of the individual zones in front of a detector-cell results in a signal from that particular detector-cell. The zones themselves could equally well be radiation-sources or field-sources (magnetic field sources, for example), also non-actinic with respect to the emulsions on the film 1 but, nevertheless, able to activate the detector-cells 6, 8, 10 and 14. Even zones of simple embossment of the surface of the film 1 have been made, their passage being detected by sensors in the form of mechanical feelers. The dimensions, location and shape of the zones should be such that they will activate the corresponding detector-cells 6, 8, 10 and 14 irrespective of the lateral (transverse) position of the film between its guides.

It should be noted, incidentally, that the hole dimemsions (their diameters) are chosen depending on the precision of the film transport guidance.

In the illustrated embodiment, each series of the holes 2, 3, 11 and 4 corresponds to an information category. The series of holes 2 and the series of holes 4 each contains groups of holes which carry, respectively, information about the sensitivity of the film 1 and the development characteristics to be utilized by the developing-machine associated with the system. Within any one series, the groups are identical and the distance between groups in the same series is such that at least one group from each series exists on each format.

The detector-cells 6, 8, 10 and 14, and the radiation sources 5, 7, 9 and 13 are located in a remotely controlled camera system (not shown in detail), for effecting the detection of the passage of the respective holes 2, 3, 11 and 4 between the radiation sources 5, 7, 9 and 13 and the detector-cells 6, 8, 10 and 14, which are sensitive to the particular radiation employed. The radiation is generally infrared, having wavelengths greater than 9000 Angstroms, such radiation being completely non-actinic with respect to the photographic emulsions used, regardless of exposure time.

As a film 1 leaves its container (not shown) and enters the camera system, it passes between the radiation sources 5, 7, 9 and 13 and the detector-cells 6, 8, 10 and 14 which sense the passage of each of the holes 2, 3, 11 and 4 in their respective series. At the start, radiation to all detector-cells 6, 8, 10 and 14 is blocked; it is restored temporarily when a hole passes over a particular one of these detector-cells, causing that cell to produce a pulse signal which is amplified, if necessary, and used in some particular way according to which one of the detector-cells 6, 8, 10 and 14 produced it.

Pulse signals from the detector cell 6 are fed, eventually through a circuit including elements 15 to 18, which will be explained later on, to the input of a binary decade counter 20, preferably connected for a binary coded decimal or BCD count (such as for example Texas Instrument Inc. SN 7490 type TTL integrated circuit). The counter 20, as illustrated, includes an output (A, B, C, D) from each respective one of its bistable flip-flop stages feeding the respective inputs of a four-bit bistable latch or quad latch 23 (made up, for example, from Texas Instrument, Inc. SN 7475 type TTL integrated circuit), which forms a temporary storage for the binary information present at the outputs of counter 20 at the end of each group of holes 2. The counter 20 obviously has to be reset before the arrival of the next group of holes 2 and its count has to be transferred from its outputs to the respective bistable stages of the four-bit latch before the first one of the following group of holes 2 passes in alignment with the source-detector pair 5 and 6. This is obtained here by means of a first 21 and a second 22 delay generator triggered by the incoming pluses from detector 6. These delay generators 21 and 22, described in more detail later on with reference to FIGS. 2 and 3 of the drawing, have their respective inputs fed in parallel with that of counter 20 and deliver rectangular pulses whose front edges coincide with that of the first pulse of each group and whose rear edges follows with respective predetermined delay time intervals that of the last pulse of each group. The first delay generator 21, whose output feeds the reset input of the counter, delivers pulses having durations longer that those of the second one 22.

The rectangular pulses from the first delay generator 21 are fed to a first input of an AND gate 25 and those from the second generator 22 are fed through an inverter or NOT circuit 24 to a second input of the AND gate 25. The output of gate 25 thus delivers a rectangular control pulse beginning after the last pulse of the preceding group and ending at the instant at which the counter 20 is being reset i.e. before the first pulse of the succeeding group.

This control pulse is fed to the clocking input of the four-bit latch 23 and controls the transcription of the count of the counter 20 into each flip-flop stage of the latch 23 before the latter is reset and ready to receive the next group of pulses.

The four outputs Q of the bistable latch 23 feed the corresponding inputs (A, B, C and D) of a decoder 26, which in this case is a "binary-coded-decimal to decimal" one (such as, for example, the Texas Instrument Inc. SN 74171 or SN 7441 type TTL integrated circuit), which has, in this case, nine useful mutually exclusive outputs 31 to 39 (as the first one, not shown, corresponds to an all zero four-bit binary number indicating only the absence of holes in the film 1).

The decoder 26 receives the four-bit binary coded decimal number (A, B, C, D) elaborated in the counter 20 as a result of the counting of the number of pulses within a group and stored in the quad latch 23. It operates as a channel selector and a driver by putting a single one of outputs 31 to 39 to a high level voltage destined to actuate the appropriate control device (not shown) of the film processing system. For example, if the holes belonging to one series (2) are arranged in groups of four, the counter 20 in association with the decoder 26 would select output 34 thereof and, hence a particular one of the control devices corresponding and particular to such groups of four holes. If the "group" had consisted of a single hole 2, the output 31 would have been selected and if two holes had been sensed, the output 32 would have been selected. Similarly, had three holes 2 been sensed in the group, the decoder output 33 would have been selected.

In the described exemplary embodiment, the number holes 2 which form a group correspond to the sensitivity of the emulsion which relates to the exposure time for the negative. The assembly composed of radiation source 5 and detector-cell 6 produces one voltage pulse per passage of each hole 2 to the counter 20. There are as many outputs 31 to 39 used in the decoder as there are different film sensitivities, four being shown for purposes of illustration. In this case the control devices are part of the camera's exposure time regulating device (not shown).

The series of holes 4, also characteristic of film emulsion, is used by the film developing portion of the system in the same way as was described above regarding the use of the series of holes 2 by the camera system. The detector-cell 14 is associated with a decoding system analogous to the one associated with detector-cell 6, this system would be used to control, in an automatic developer, a device for establishing developing time corresponding to the film sensitivity.

The holes 11 signify the beginning of the film 1. The detector-cell 10, in association with the ratiation source 9, produces a pulse which is sent out to the camera system to a film-inventory station, where a conventional counter sums similar pulses coming from one or several camera systems and makes appropriate adjustment in the inventory lists. These adjustments could, if desired, also include breakdown by film quality. For this purpose, in a variant of the invention, the hole 11 would be replaced by a group of holes analogous to the holes 2, described above. In this case, the detector-cell 10 would forward signals due to the holes 11 to a counter-decoder circuit arrangement similar to the one described above, which, in turn, would direct a single pulse to a particular counter related to that film quality implied by the number of holes 11 in the group.

The hole 3 signifies the end of the film and the signal which is produces is used tto start an end-of-film sequence. Its position on the film is such that sufficient film remains for ensuring proper transport through the system: it can activate an ejection mechanism or a respooling mechanism.

If the system according to the invention is to be used in conjunction with a radiographic camera, where the film is intermittently fed thereto, i.e. it may start or stop at a random position of the film with respect to the source-detector pairs — 5,6; 7,8; 9,10 and 13,14. This may often result in a counting error at the beginning or the end of the film motion and in the latter case, produce an output signal at one of the outputs 31 to 39 of the decider 26 which does not correspond to the actual sensitivity of the film. This spurious signal may gives rise to an erroneous automatic exposure time adjusting and the picture will have to be retaken, resulting thus in unnecessary irradiation of the patient and waste of film.

To avoid this, the pulse signals from detector-cell 6 are fed via a pulse shaper 15, such as an amplitude limiter-amplifier, which delivers constant amplitude pulses having a duration inversely proportional to the film motion speed. These pulses from the pulse shaper 15 are fed, on the one hand, to a first or signal input of a gate 16 and, on the other hand, to a pulse width discrimination 17 delivering at its output a voltage substantially proportional to the duration of the pulse applied to its input. Such a discriminator 17 generally includes an integrating circuit, which may be made up by a Miller integrator using an integrated circuit operational amplifier. The output voltage from the discriminator 17 is fed to the input of a threshold trigger circuit 18, such as a Schmitt trigger (d. c. coupled and triggered by a direct voltage of adjustable level) or a voltage comparator, delivering a high level voltage when its input voltage is below a certain threshold value and a low level voltage when it passes above this threshold. The triggering voltage of the threshold trigger 18 is preferably adjusted so as to produce a low level output voltage for a film speed below half of the nominal one. The output voltage of the threshold trigger 18 is fed to the control input of of the gate 16, whose output feeds the counter 20 and the delay generators 21 and 22. Thus when the film motion is show, i.e. right after its starting or before its stopping, the gate 16 becomes blocked and does not let the pulses through to the rest of the circuit. It is however advantages to also block the clocking input of the bistable latches by a further gate (not shown in FIG. 1) whose control input is connected to conductor 19, such an arrangement is shown on FIG. 4.

It is to be remarked here, that if the film transport mechanism includes a tachogenerator delivering a voltage proportional to the film speed, this voltage can be used in conjunction with a threshold trigger for unblocking the gate when the voltage is above a predetermined level with the same result as hereinabove.

Figure 2:
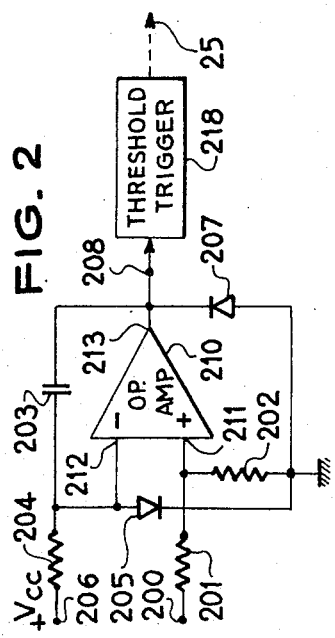
FIG. 2 shows schematically a preferred embodiment of the delay generators 21 and 22 of FIG. 1.

In FIG. 2, there is schematically illustrated a useful embodiment of a delay time generator (21 and 22), although other known circuits may be used including a capacitor, with a very short charging time constant and a long discharging time constant thereof (such as a phantastron type delay). FIG. 3 shows the waveforms appearing at different points of the circuit of FIG. 2 and of blocks 21, 22, 24 and 25 of FIG. 1.

The output pulses from the detector 6 ($e_6$ of FIG. 3) are fed to the input 200 of the delay generator shown in FIG. 2. They are applied through a resistive voltage divider 201, 202 to the non-inverting (+) input 211 of an operational amplifier 210, the resistor 201, of small value, being connected between the input 200 and the non-inverting input 211, while the resistor 202, of high value, is connected between the latter and ground. The output 213 of the amplifier 210 is coupled to its inverting (−) input 212 by means of a capacitor 203 of relatively high value C, which will be determined in manner explained hereinafter. The inverting input 212 is also connected to the positive terminal 206 of a voltage supply $+V_{cc}$, whose negative terminal is grounded, by means of a resistor 204 whose value R will be determined in a manner explained later on together with that of the capacitor 203, both of which control the desired delay time interval.

The operational amplifier's inverting input 212 is clamped to ground by means of a first diode 205 so that it receives only negative going voltages and its output 213 is clamped to ground by means of a second diode 207 so that all output signal levels are positive.

The detector pulses $e_6$ (FIG. 3) applied to the noninverting input are amplified by the amplifier 214 and substantially instantaneously charge the capacitor 203 to a positive voltage between output 213 and inverting input 212. At the end of each pulse the output 213 tends to return to zero, however the capacitor 203 being charged to a voltage U, a negative voltage appears at the inverting input 212. While the capacitor 203 discharges through the resistor 204, this makes the voltage at the output 213 or 208 decay linearly towards zero, as shown at $e_{208}$ in FIG. 3. The slope of this linear decay, as well as the fall time $t_f$ of the output voltage $e_{208}$ from U to zero, are functions of the product R.C, which are the respective values of the resistor 204 and the capacitor 203.

Each successive pulse ($e_6$, FIG. 3) instantaneously recharges capacitor 203 to voltage U, so that if the fall time $t_f$ is chosen big enough i.e. much greater than the time interval between two successive pulses of a group (series), the output voltage $e_{208}$ will decrease, between these pulses, only to a value greater than a predtermined threshold voltage $V_T$, which will be explained hereinafter.

After the end of the last pulse of group the output voltage $e_{208}$ will linearly decrease to zero during the fall time interval $t_f$. The fall time interval $t_{f21}$ of the first delay generator 21 controlling the resetting of counter 20 and thus the time constant R.C thereof, will have to be chosen so that the output voltage $e_{208}$ will reach zero at about half of the interval $t_s$ between the last pulse $e_6$ of a group and the first one of the following group for the greatest possible film speed.

The fall time interval $t_{f22}$ of the second delay generator 22 controlling the transfer of the counter outputs to the bistable latches, and its time constant R.C will have to be chosen to be equal to about one half of $t_{f21}$.

The output voltage $e_{208}$ of the operational amplifier circuit feeds the input of a threshold trigger 218, which may be of the same type as block 18 of FIG. 1, whose "on" triggering voltage has to be smaller than U and whose "off" triggering voltage $V_T$ is to be set smaller than the lowest voltage reached between neighboring pulses of one group. Such a threshold trigger 218 delivers a rectangular waveform ($e_{21}$ or $e_{22}$ of FIG. 3) going to a positive level together with the leading edge of the first pulse of each group and returning to zero level after predetermined time interval following the trailing edge of the last pulse of this group. Thus both the reset time instant $t_r$ and that of the bistable latch transfer $t_1$ follow the trailing edge of the last pulse i.e. after the counter 20 has been fed all the necessary data.

As has been explained hereinbefore, the output waveform $e_{21}$ of the first delay generator 21 (starting at $t_0$ and ending a $t_r$) is applied to one input of an AND gate 25 and the output waveform of the second generator 22 (starting at $t_0$ and ending $t_1$, which is smaller than $t_r$) is applied to an inverter stage 24 deliverying a waveform shown at $e_{24}$ of FIG. 3.

The inverted waveform $e_{24}$ being applied to the other input of the AND gate 25, this gate delivers a pulse waveform $e_{25}$ (FIG. 3) starting at $t_1$ and ending at $t_r$. This waveform $e_{25}$ is applied to the clocking input of the bistable latches 23 for transfering the count of counter 20 to its bistable storage stages while $e_{25}$ is at its high level, i.e. before resetting the counter 20.

Figure 4:
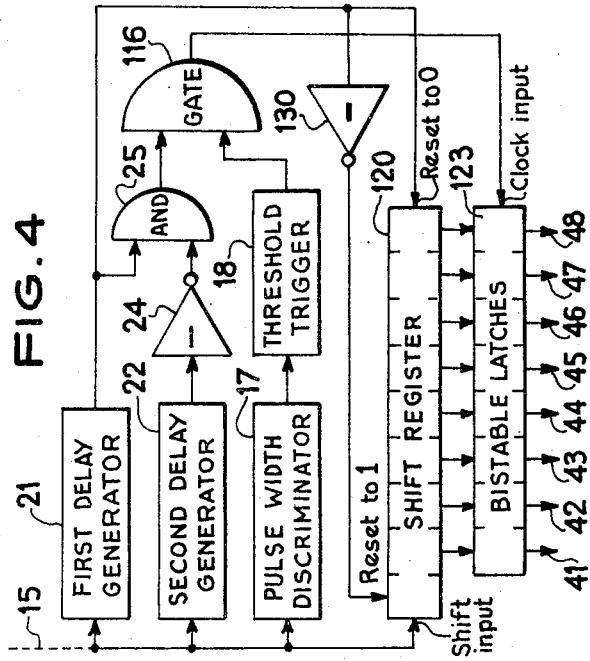
FIG. 4 shows a variant embodiment of the logic circuits used in a system according to the invention.

Another embodiment of the circuit associated with the system according to the invention is shown in FIG. 4, where the same numerals designate the same elements as in FIG. 1. In the simple embodiment of FIG. 4, the counter 20 is replaced by a nine-bit shift register 120, whose parallel outputs respectively feed the inputs of an eight-bit bistable latch 123 (such as the Texas Instrument Inc. SN 7475 type TTL integrated circuit). The shift register 120 preferably includes one more stage than the highest number of pulses in a group to be counted (i.e. nine stages) and is fed on its shift input by the incoming pulses from the detector-cell 6. The first stage of register 120 is reset to the high level (1 state) by means of an inverter 130 coupled to the output of the first delay generator 21, while the other stages, whose respective outputs feed the latches 123 are reset to low level (0 state). Thus with each incoming pulse the high level is shifted from the first stage to the following one and, at the end of the pulse group, the appropriate stage of register 120 is in its high level position.

The control of the bistable latches 123 is carried out in the same manner as in the circuit of FIG. 1, but here the gate 116, controlled by the series combination of pulse width discriminator 17 and threshold trigger 18, is advantageously inserted between AND gate 25 and the clocking input of latches 123. Thus no transfer from register 120 is taking place while the film speed is slow and the bistable latch stores and delivers at its outputs 41 to 48 correct data used in the same way as those of decoder 26 in FIG. 1.

While the illustrated embodiments have been described with holes in the film, which are used to provide coded information, it is to be appreciated that the holes could be replaced by zones of altered transmissivity and/or reflectivity with respect to radiation. It is also to be appreciated that the zones themselves could constitute sources of radiation or of a magnetic field.

The counter 20, of course, as well as other circuit elements could be replaced by equivalent circuits. Other logic circuits could be used if desired.

It is to be understood that the foregoing description of the specific embodiments of the invention is not to be considered as limitations upon its scope, which is defined in the appended claims.

That which is claimed is:

1. A system for processing photographic or radiographic film comprising, in combination:
   a. an unexposed film having sensible coded information encoded in predetermined zones of said film, said sensible coded information being present in predetermined numbers at predetermined locations for identifying in code at least one intrinsic characteristic of said film;
   b. sensing means positioned adjacent to said zones of said film for sensing passage of said coded information; and
   c. means for moving said film along a path past said sensing means.

2. A system as defined in claim 1, wherein said zones are zones of altered transmissivity constituting said coded information with respect to a predetermined radiation, and said sensing means includes at least one detector-cell sensitive to said radiation; and further comprising at least one source of said predetermined radiation positioned adjacent to said film for supplying said predetermined radiation to said at least one detector-cell via said zones as said film moves.

3. A system as defined in claim 1, wherein each of said zones is made up from a magnetic field source constituting said conded information and said sensing means includes at least one detector-cell sensitive to said field for generating an electrical signal at each passage of a zone past said detector-cell.

4. A system according to claim 1, wherein said zones are arranged on said film into groups, each group including at least one zone disposed along a line parallel to said film path, said groups being arranged into series whereof each series includes evenly spaced groups of identical zones disposed along said line, said film including a plurality of series respectively arranged along separate lines parallel to each other and said film path; and wherein said sensing means comprises a plurality of detector-cells adjacent to said film, each said detector-cell being adjacent to a respective one of said lines along which said series are arranged, whereby motion of the flim past said detector-cells causes individual ones of these cells to produce a signal upon passage of individual zones past respective cells, groups of signals corresponding to the groups of zones being produced by at least one of the detector-cells.

5. A system as defined in claim 1, wherein at least some of said zones are arranged in groups and said sensing means includes a detector-cell responsive to passage of zones of said groups; and further comprising counter means coupled to said detector-cell and responsive to signals therefrom for producing a distinctive control signal related directly to a count produced by passage of each group of zones past said detector-cell, the count corresponding to the number of zones in a group, a plurality of control channels, and selector means coupled to said counter means and responsive to the control signals therefrom for selecting one channel from said plurality of control channels in accordance with the particular control signal received from said counter means.

6. A system as defined in claim 5, including resetting means coupled to said counter means and coupled from said detector-cell via an activating time delay which is greater than the duration of passage of one group of said zones past said detector-cell and which is less than the length of time measured from an instant of passage of the last zone of one group of said zones to the instant of passage of the first zone of the following group of said zones past said detector-cell at a given film feed speed.

7. A system as defined in claim 5, wherein said selector means produces a voltage signal which is fed to the selected one of said plurality of channels.

8. A system as defined in claim 1, wherein at least some of said zones are arranged in groups and said sensing means includes a detector-cell responsive to passage of zones of said groups; and further comprising a shift register whose shifting is controlled by means of pulses coming from said detector-cell, the position of a binary high level state within the shift register indicating the number of zones detected; means for resetting said shift register after passage of each group; means for storing said shift register binary high level position having as many stages as said register and for delivering a control signal from the stage at binary high level; and means for controlling the transfer of information from said shift register to said storing means after the passage of said group and before resetting said register.

9. A system as defined in claim 1, wherein said zones are zones of altered reflectivity constituting said coded information with respect to a predetermined radiation, and said sensing means includes at least one detector-cell sensitive to said radiation; and further comprising at least one source of said predetermined radiation positioned adjacent to said film for supplying said predetermined radiation to said at least one detector-cell via said zones as said film moves.

* * * * *